US009413237B2

(12) United States Patent
Teggatz et al.

(10) Patent No.: US 9,413,237 B2
(45) Date of Patent: Aug. 9, 2016

(54) DRIVER METHOD

(71) Applicant: TRIUNE SYSTEMS, LLC, Plano, TX (US)

(72) Inventors: Ross E. Teggatz, McKinney, TX (US); Wayne Chen, Plano, TX (US); Amer Atrash, Richardson, TX (US); Brett Smith, McKinney, TX (US); Narasimhan Trichy, McKinney, TX (US); James Kohout, McKinney, TX (US); Jonathan R. Knight, Osaka (JP)

(73) Assignee: TRIUNE SYSTEMS, LLC, Plano, TX (US)

(*) Notice: Subject to any disclaimer, the term of this patent is extended or adjusted under 35 U.S.C. 154(b) by 0 days.

(21) Appl. No.: 14/805,331

(22) Filed: Jul. 21, 2015

(65) Prior Publication Data

US 2015/0326118 A1 Nov. 12, 2015

Related U.S. Application Data

(63) Continuation of application No. 13/232,855, filed on Sep. 14, 2011, now Pat. No. 9,089,029.

(60) Provisional application No. 61/382,747, filed on Sep. 14, 2010.

(51) Int. Cl.
*H05B 37/02* (2006.01)
*H02M 3/156* (2006.01)
*H05B 33/08* (2006.01)

(52) U.S. Cl.
CPC ............ *H02M 3/156* (2013.01); *H05B 33/0815* (2013.01); *H05B 33/0818* (2013.01); *H05B 33/0827* (2013.01); *H05B 33/0851* (2013.01)

(58) Field of Classification Search
CPC .... H05B 37/02; H05B 33/08; H05B 33/0818; H05B 33/0827; H05B 33/0851
USPC .................... 315/209 R, 291, 299, 307, 308
See application file for complete search history.

(56) References Cited

U.S. PATENT DOCUMENTS 7,425,803 B2 * 9/2008 Shao .................. H05B 33/0815
315/291

\* cited by examiner

*Primary Examiner* — Jimmy Vu
(74) *Attorney, Agent, or Firm* — Jackson Walker LLP; Christopher J. Rourk

(57) ABSTRACT

The invention provides advances in the arts with useful and novel driver methods. The invention provides circuit driver and control methods for relatively high-current drivers, usable with relatively low-voltage battery power sources. Preferred embodiments include one or more high series resistance capacitors electrically connected with a power source. A low resistance driver circuit regulates power supplied from the capacitors to the load.

21 Claims, 2 Drawing Sheets

DRIVER METHOD

RELATED APPLICATIONS

This application is a continuation of U.S. patent application Ser. No. 13/232,855, filed Sep. 14, 2011, now U.S. Pat. No. 9,089,029, which claims priority to and benefit of U.S. Provisional Patent Application Ser. No. 61/382,747, filed on Sep. 14, 2010, which is hereby incorporated by reference for all purposes as if set forth herein in its entirety. This application and the Provisional Patent Application have at least one common inventor.

TECHNICAL FIELD

The invention relates to microelectronic driver methods and associated circuitry. More particularly, the invention relates to driver methods particularly suited for use with flash driver circuits and systems for driving LEDs using capacitors as a power source.

BACKGROUND OF THE INVENTION

It is sometimes desirable to use components with high current requirements in portable electronic apparatus. Problems arise, however with driving high-current devices using relatively low voltage power supplies, such as common batteries for example. On the one hand, battery voltage must be sufficient to drive the high-current devices. On the other hand, the current requirements may be so high that there is a risk of damaging the batteries. An example is the use of powerful LEDs as flash elements in small cameras. Overall, this is desirable in order to reduce battery drain, reduce cost, and minimize device size compared to xenon flash systems. Commonly available Lithium Ion (Li-Ion) batteries often used in such applications are limited in their voltage capacities, however, and are often incapable of withstanding the high currents required for driving the LEDs. One potential solution to the problem is to use the available batteries for charging capacitors capable of being charged to sufficient voltage levels and then in turn using the capacitors to drive the LEDs. In such instances it would be desirable to use a low-resistance switch to drive the LEDs if not for the following problems. The current has a tendency to change as the capacitors are discharged. The LEDs themselves can have significant processing variation, in turn yielding forward voltage variation. There is also a temperature coefficient associated with the forward voltage drop of the LEDs, which affects the charging performance.

Due to the foregoing and other problems and potential advantages, improved driver methods, particularly LED driver methods, would be useful contributions to the applicable arts.

SUMMARY OF THE INVENTION

In carrying out the principles of the present invention, in accordance with preferred embodiments, the invention provides advances in the arts with useful and novel methods for driving circuits using improved techniques for changing drive current and voltage levels as needed in a particular application. All possible variations within the scope of the invention cannot, and need not, be shown. It should be understood that the invention may be used with various conductive materials and various substrate materials, components, and IC package formats. It should be understood that the drive current control techniques described herein generally imply analogous drive voltage techniques, and vice versa.

According to one aspect of the invention, in an example of a preferred embodiment, a method is disclosed for driving a load using a step of determining a drive current requirement associated with the load. In a further step, a voltage level sufficient to produce the drive current required by the load is determined. Another step includes providing the required drive current to the load.

According to another aspect of the invention, a preferred embodiment of a driver method includes steps for characterizing load elements and deriving in advance voltage levels required for producing and providing the required drive current for the load.

According to another aspect of the invention, a preferred embodiment of a method for driving a load includes steps for determining the required load current and deriving a corresponding voltage level, in part by measuring equivalent series resistance of a circuit for providing current to the load.

According to another aspect of the invention, a preferred embodiment of a method for driving a load includes steps for providing one or more current pulses to the load in order to determine the required load current and steps for using the one or more current pulses to calculate the drive current requirement.

According to another aspect of the invention, a preferred embodiment of a method for driving a load includes steps for extracting feedback from the load for use in the deriving the appropriate voltage level for providing the current required by the load.

According to another aspect of the invention, a preferred embodiment of a method for driving a load includes steps for storing and/or retrieving historical data relative to drive current in order to determine drive current requirements.

The invention has advantages including but not limited to providing one or more of the following features, reduced driver dropout, reduced power dissipation, and improved efficiency. These and other advantageous, features, and benefits of the invention can be understood by one of ordinary skill in the arts upon careful consideration of the detailed description of representative embodiments of the invention in connection with the accompanying drawings.

BRIEF DESCRIPTION OF THE DRAWINGS

The present invention will be more clearly understood from consideration of the description and drawings in which.

References in the detailed description correspond to like references in the various drawings unless otherwise noted. Descriptive and directional terms used in the written description such as front, back, top, bottom, upper, side, et cetera, refer to the drawings themselves as laid out on the paper and not to physical limitations of the invention unless specifically noted. The drawings are not to scale, and some features of embodiments shown and discussed are simplified or amplified for illustrating principles and features as well as advantages of the invention.

DESCRIPTION OF PREFERRED EMBODIMENTS

Although the making and using of various specific exemplary embodiments of the invention are discussed herein, it should be appreciated that the systems and methods described and shown exemplify inventive concepts which can be embodied in a wide variety of specific contexts. It should be understood that the invention may be practiced in various applications and embodiments without altering the principles of the invention. For purposes of clarity, detailed descriptions of functions, components, and systems familiar to those skilled in the applicable arts are not included. In general, the invention provides improved driver methods. Preferred embodiments of the invention include dynamic adjustment of driver voltages and/or currents according to real time conditions. The invention is described in the context of representative example embodiments. Although variations in the details of the embodiments are possible, each has advantages over the prior art.

An approach used in the methods of the invention is to adapt the driver voltage supply output to meet the need for current at the load being driven. The technique used by the invention includes endeavors to set the voltage at a level slightly higher than that required to support the desired load current. As a result, the load may be driven with a relatively low dropout. In turn, the power dissipation and efficiency of the entire system driving the load may be improved by reducing the driver dropout and therefore the power dissipation in the driver.

Figure 1:
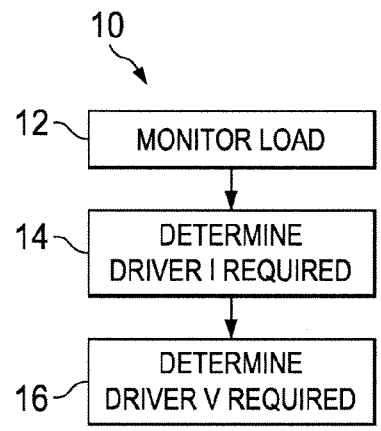
FIG. 1 is a process flow diagram illustrating examples of preferred embodiments of driver methods in accordance with the invention.

The invention provides several alternative approaches which may be used to detect and set the correct voltage for providing the required load current. Referring initially to FIG. 1, the flow of a method 10 of driving a load is shown. Preferably, the load is monitored 12 for its current and voltage characteristics. In some instances, it may be desirable to monitor additional parameters, such as temperature or light, for example. From the monitored load, a drive current suitable to drive the load is determined 14. Based on the drive current requirement, the voltage level sufficient to produce the drive current may be determined and provided 16. The voltage level may be derived from the monitored drive current level and any additional offsets required based on the characteristics of the load circuit, including the power source, expected losses due to resistance, temperature, and similar factors affecting circuit performance. For efficiency, the required load current is preferably provided using a circuit having low resistance. There are a number of variations possible in performing the steps indicated. In some applications, it may be deemed sufficient to determine the drive current in a single instance, using the determination for all future load events. In other applications it may be more desirable to determine the load current periodically, or on an event-by-event basis in real time. Further examples are described herein.

In an example of a preferred method for controlling a driver circuit which obtains its power from one or more storage capacitors, the equivalent series resistance (ESR) of the storage capacitors introduce an additional variable to the operation of the circuit. Accordingly, it is preferred to monitor the ESR of the capacitors as they are charged. The information obtained from this monitoring is then used to calculate an appropriate adjustment to be included in the supply rail set point. In order to measure the ESR, the voltage during charging is measured at a known charging current. The charging is stopped at a given time and the capacitor voltage is measured again. The ratio of the voltage to the charging current is used to calculate the capacitor ESR. Knowing the ESR and the required load current, e.g., the flash current in a flash LED circuit, the LED drive voltage is then increased accordingly. For applications in which the capacitor charging current is different from the LED flash current, an additional multiplier can be determined for use in deriving the proper relationship.

Figure 3:
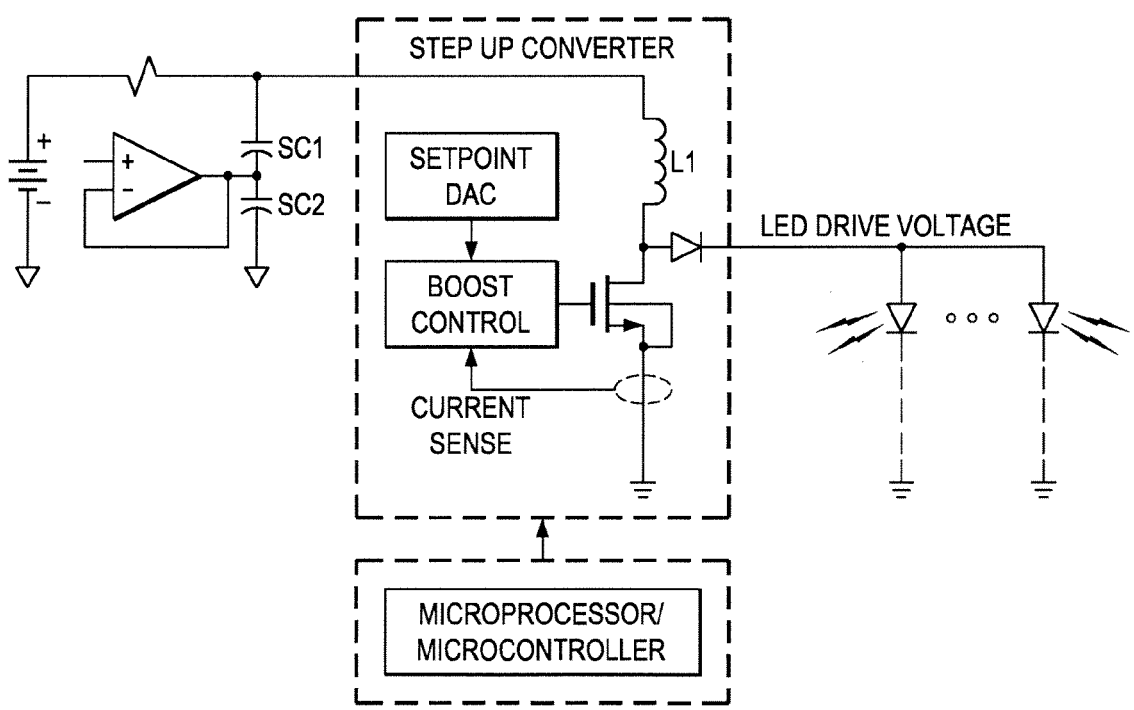
FIG. 3 is a simplified schematic circuit diagram illustrating an example of preferred embodiments of methods and associated circuits and systems and according to the invention.
Figure 2:
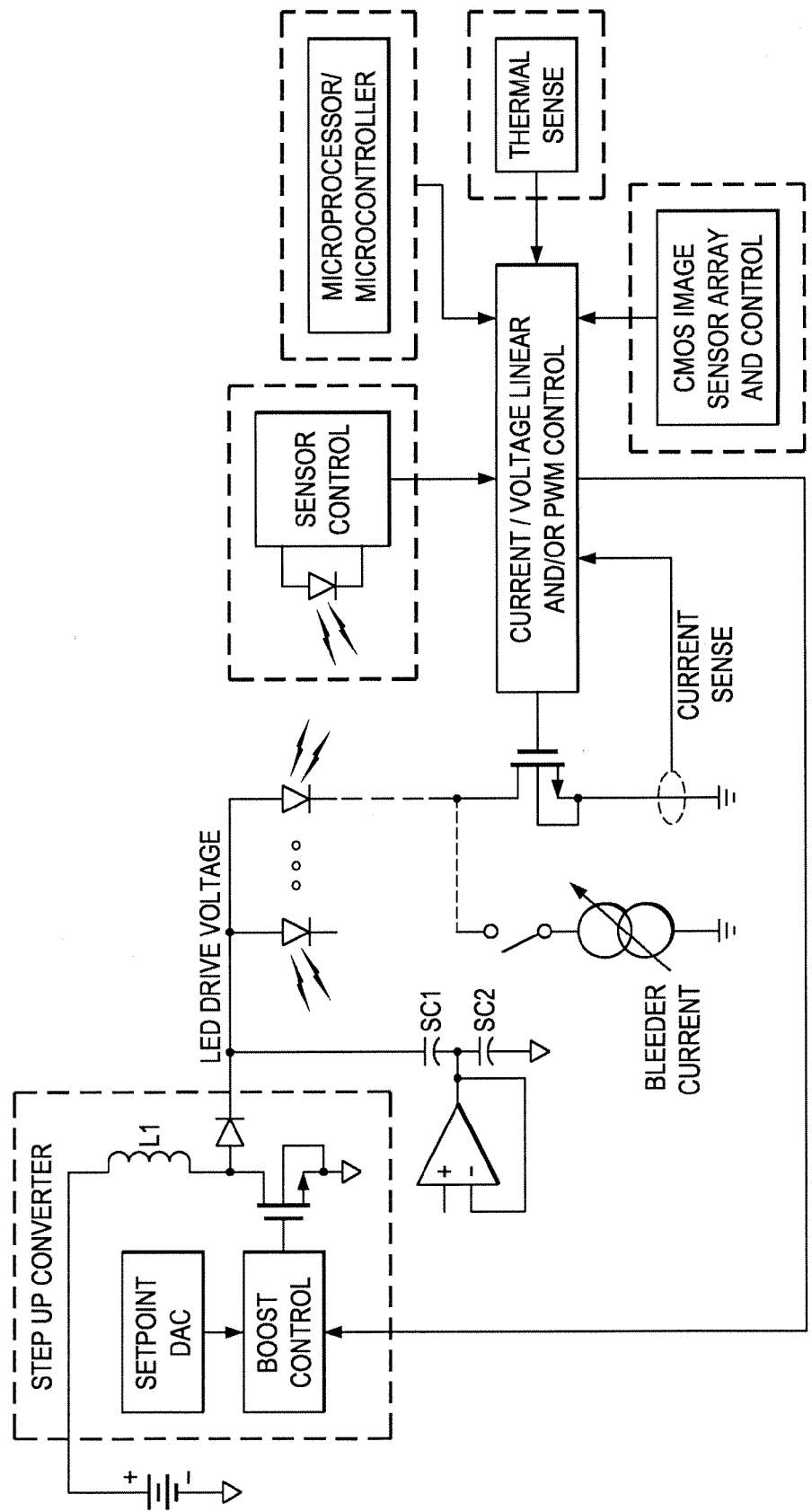
FIG. 2 is a simplified schematic circuit diagram illustrating an example of preferred embodiments of methods and associated circuits and systems and according to the invention.

As shown in each of FIGS. 2 and 3, in examples of systems for implementing the methods of the invention, a circuit is provided in which a battery is coupled to a step-up converter for charging a plurality of capacitors. The capacitors are coupled in series with a load device, in this example LEDs, having fairly high voltage and current requirements relative to the battery. The capacitors are selected for their ability to provide a relatively high current pulse at the LEDs without overtaxing the battery. In this example assuming an LED requiring about 4V, it is preferred to place at least two capacitors in series in order to provide enough supply voltage to be able to drive each LED. In principle, any number of capacitors may be placed in series, but on the other hand, it is desirable to minimize the number of large capacitors that must be used in a system. As further described herein, it is preferred to use various sensors and controls, such as thermal and/or image sensors, and PWM and/or microcontrollers, to control the operation of the systems used to implement the methods.

In an example of a preferred method for controlling a driver circuit which is anticipated to vary in its operational parameters, it may be preferable to characterize the system in real time in order to determine the appropriate supply voltage for ensuring the appropriate drive current. In order to do so, the load is pulsed one or more times prior to an actual flash event. Pulses of one or more different voltages close to or approaching that anticipated to be required to obtain the desired current level may be used. The current and voltage of each of the pulses is then used to derive the voltage required to provide the desired current for driving the load. An example of an implementation of this method is to continuously flash an LED, or array of LEDs, during charging of associated storage capacitors. The capacitors continue to charge until the LED drive voltage is sufficiently high to achieve the required current output. In the example of an LED flash application, in order to minimize the visible impact of the pulsing calibration, one or more low voltage and low current pulses may be used. The light given off by the LEDs due to a low current pulse is negligible. In this example, since the current is much lower than that required for a flash event, additional extrapolation is required to derive the desired supply voltage. This extrapolation may be linear, piece-wise-linear, exponential, lookup-table based, history table based, or based on some other function or combination of functions selected based on the circuit components and their arrangement.

In another example of preferred methods for controlling driver circuits, additional data regarding parameters present in the circuit may also be collected and used to determine the appropriate set point for the drive voltage. In the case of an LED system, for example, a light sensor integrated into the system may be used to monitor the light level. This data is used to adjust the LED drive voltage as needed to maintain the desired brightness. Additional sensors, such as temperature sensors or image sensors may also be used separately or in combination with the light sensor to provide a more accurate set point. A light sensor used as described may be included in close proximity to the LEDs or integrated into the LEDs or LED arrays themselves. In such implementations, the light sensors may be used to measure the LED output, rather than just the light returned to an external sensor. In one implementation of this technique, a system using multiple diodes can use one or more diodes as a sensing element while flashing one or more of the remaining diodes. It is believed that the use of light output data enhances the precision and efficiency of the system. In an example of another possible variation among embodiments contemplated within the scope of the invention, in order to determine the turn-on voltage of the LEDs (or other load elements) a current can be applied to the diode during the supply capacitor charging. When the LED drive voltage reaches the forward voltage of the LED, the LED begins to conduct and the LED cathode voltage begins to increase. This point and one or more additional data points may be measured to extrapolate the diode characteristics, which may then be used to derive further useful data relating to the operation of the system.

A further example of another possible variation useful for optimizing the determination of the set point of the LED supply rail is to include information from previous flash events. Using this technique, historical voltage and current for each flash event is measured and used to adjust the set point. If the LED characteristics change over time, then the measured changes can be used to make the appropriate adjustment every time there is a flash event. This technique does not require additional calibration pulses, but nevertheless accounts for changes to circuit components, such as LEDs, over time. The LEDs can be monitored and adjustments made for every flash event or for only some of the flash events, depending upon the expected rate of change or other factors.

One example of such an implementation is to use factory settings to set the initial voltage. During product test, the device is put through several flash cycles and the initial LED drive voltage is thereby determined. This information is stored in non-volatile memory and may be updated, periodically or constantly, as needed during the life of the system as flash events occur. The non-volatile memory may be incorporated into the LED flash controller, or in a separate integrated circuit or microcontroller associated with the system.

Again referring to FIGS. 2 and 3, additional system attributes may be used to enhance the implementation of the methods. For example, the efficiency of the system may be further improved by the incorporation of an inductor in series with the diodes. The inductor allows for continuous current flow through the LEDs, precise regulation of the current and full switching of the LED driver. An additional alternative architecture places the storage capacitors on the step-up converter input. In this architecture, the converter control loop can control the output current directly; achieving high efficiency and highly accurate control without a specific LED drive voltage set point calibration. The exemplary step-up-converter shown can alternatively be a switching regulator such as a boost converter or a charge pump. A resistor placed between the battery and the storage capacitors will limit the inrush current and the current that is drawn from the battery during the flash event. The diodes in this implementation can be placed in series and the drive voltage increased as needed to provide the required current. If diodes are placed in parallel, additional current control loops may be used to compensate for mismatch between the diodes.

To improve the quality of the captured image in a camera system, the LED flash intensity can be changed during a single flash event and the image can be captured using more than one flash intensity. These multiple images can be combined to eliminate effects resulting from too-high or too-low intensity, such as washed-out images. If several images are available that were captured using different light intensities, then the pixels that were overexposed at high intensity can be replaced with the information captured at low intensity. In an analogous fashion, pixels that were underexposed can be replaced by pixels that had a more optimum exposure. As a further improvement, the data collected at multiple exposure levels can be interpolated to achieve a more optimum image. This can be applied to exposure control or to red-eye reduction.

It should be appreciated by those skilled in the arts that the above-described techniques may be used in various combinations to achieve a more optimum set point for a drive voltage. Analogous techniques can also be used to set LED drive current using the above-described methods. In using any of these techniques, additional calibration techniques such as a look-up-table or feedback can be included to account for temperature variation of the system. Any of the techniques used to optimize the LED drive voltage for the flash event can also be used to optimize the system for a torch or lantern mode. The LED voltage can be measured during the flash event or the history of flash events and can be used to measure the LED temperature. This eliminates the need for an external temperature sensor and can provide the exact LED temperature instead of just the temperature in the proximity of the diode. The methods of the invention provide one or more advantages including but not limited to improved performance and/or efficiency in driver circuits. While the invention has been described with reference to certain illustrative embodiments, those described herein are not intended to be construed in a limiting sense. Variations or combinations of steps or materials in the embodiments shown and described may be used in particular cases without departure from the invention. Although the presently preferred embodiments are described herein in terms of particular examples, modifications and combinations of the illustrative embodiments as well as other advantages and embodiments of the invention will be apparent to persons skilled in the arts upon reference to the drawings, description, and claims.

We claim:

1. A circuit comprising:
   a driver circuit;
   a controller coupled to the driver circuit and configured to determine a drive current requirement associated with a load and an equivalent series resistance of the driver circuit;
   voltage control circuitry coupled to the controller and configured to control a voltage level to produce the drive current requirement associated with the load; and
   low resistance drive current circuitry coupled to the load and configured to provide the drive current requirement associated with the load.

2. The circuit of claim 1 wherein the controller is configured to characterize one or more load elements.

3. The circuit according to claim 1 wherein the controller is configured to characterize one or more load elements in real time.

4. The circuit according to claim 1 wherein the controller is configured to provide one or more current pulses to the load.

5. The circuit according to claim 1 wherein the controller is configured to use one or more current pulses to calculate the drive current requirement.

6. The circuit according to claim 1 wherein the controller is configured to use one or more low-current pulses to calculate the drive current requirement.

7. The circuit according to claim 1 wherein the controller is configured to extract feedback from the load.

8. The circuit according to claim 1 wherein the controller is configured to extract temperature data from the load.

9. The circuit according to claim 1 wherein the controller is configured to extract light output data.

10. The circuit according to claim 1 wherein the controller is configured to store historical data relative to drive current.

11. The circuit according to claim 1 wherein the controller is configured to retrieve stored historical data relative to previous drive current.

12. The circuit according to claim 1 wherein the load comprises one or more LEDs.

13. The circuit according to claim 1 wherein the load comprises one or more flash LEDs.

14. The circuit according to claim 1 wherein a voltage is supplied by one or more batteries.

15. The circuit according to claim 1 wherein a voltage is supplied by one or more capacitors.

16. A circuit comprising:
    a controller configured to determine a drive current requirement associated with a load by providing one or more low-current pulses to the load, and a voltage level calculated to produce the drive current required by the load using the one or more low-current pulses; and
    a low resistance driver circuit coupled to the controller and configured to provide the required drive current to the load.

17. The circuit of claim 16 wherein the controller is configured to characterize of one or more load elements.

18. The circuit according to claim 16 wherein the controller is configured tp extract feedback from the load.

19. A circuit comprising:
    a controller configured to determine a drive current requirement associated with a load;
    the controller configured to determine a voltage level to produce the drive current requirement associated with the load;
    a low resistance driver circuit coupled to the controller and configured to provide the drive current requirement associated with to the load; and
    the controller is configured to retrieve stored historical data relative to previous drive current.

20. The circuit of claim 19 wherein the controller is configured to characterize one or more load elements.

21. The circuit of claim 19 wherein the controller is configured to extract feedback from the load.

\* \* \* \* \*